United States Patent [19]
Shiraishi

[11] 3,874,350
[45] Apr. 1, 1975

[54] IGNITION SYSTEM FOR AN INTERNAL COMBUSTION ENGINE

[75] Inventor: Hideo Shiraishi, Hiroshima-ken, Japan

[73] Assignee: Toyo Kogyo Co. Ltd., Hiroshima-ken, Japan

[22] Filed: Feb. 20, 1974

[21] Appl. No.: 444,114

[30] Foreign Application Priority Data
Feb. 22, 1973  Japan.............................. 48-23379

[52] U.S. Cl............................................. 123/117 R
[51] Int. Cl.............................................. F02b 5/00
[58] Field of Search......... 123/117 R, 117 A; 60/285

[56] References Cited
UNITED STATES PATENTS
1,792,072   2/1929   Chryst................................ 123/117
3,577,963   5/1971   Bechmann.......................... 123/117
3,793,833   2/1974   Busshuyson......................... 60/284

*Primary Examiner*—Manuel A. Antonakas
*Assistant Examiner*—James W. Cranson, Jr.
*Attorney, Agent, or Firm*—Fleit & Jacobson

[57] ABSTRACT

Ignition system for an internal combustion engine which provides at least two ignition timings which are retarded from normal ignition timing whereby the engine is started with the most retarded ignition timing and the ignition timing is sequentially advanced after the engine start. The invention is particularly effective to decrease air polluting constituent in engine exhaust gas and improve drivability during engine warm up.

12 Claims, 7 Drawing Figures

IGNITION SYSTEM FOR AN INTERNAL COMBUSTION ENGINE

The present invention relates to an ignition system for an internal combustion engine and more particularly to an engine ignition system in which engine ignition timing is retarded and thereafter sequentially advanced during engine warming up period so as to decrease air polluting constituents in engine exhaust gas and improve drivability thereof during such a period.

Hithertofore, it has been known in an internal combustion engine to retard ignition timing during a warming up period so as to reduce amount of air polluting constituent in engine exhaust gas. Since the temperature of the exhaust gas increases in relation with an increase in retard angle of the ignition timing as far as the engine can provide a stable operation, it is advisable to increase the angle of retard of the ignition timing as much as possible in order to decrease the warming up period and keep the engine exhaust gas clean.

However, an automobile equipped with such an internal combustion engine is often started to move even during the warming up period and, in such an instance, the engine cannot provide a sufficient power if the ignition timing is excessively retarded. Further, in an engine having an exhaust system provided with a reactor type exhaust gas cleaner such as a thermal reactor or a catalytic reactor, since the heat capacity of the reactor is usually different from that of the engine itself, the warming up of the engine is not completed even after the completion of the reactor warming up. If the engine is still operated with the retarded ignition timing to warm up the engine itself even after the reactor is completely warmed, the latter may be excessively heated by the excessively high exhaust gas temperature and the life of the reactor may be unavoidably decreased.

Thus, it is an object of the present invention to provide an ignition system for an internal combustion engine which can decrease the engine warming up period so as to decrease the amount of air pollution constituents exhausted from the engine with the engine exhaust gas.

Another object of the present invention is to provide an engine ignition system which can improve drivability during engine warm up period of an automobile which is equipped with the engine.

A further object of the present invention is to provide an ignition system for an internal combustion engine having a reactor type exhaust gas cleaner, which can increase durability of the reactor.

According to the present invention, the above and other objects can be achieved by an ignition system which provides at least two ignition timings which are retarded from a normal or standard ignition timing and in which engine is started with the most retarded ignition timing and the timing is sequentially advanced after engine start. According to one feature of the present invention, the advance of the ignition timing after engine start is controlled by means of a timer or a temperature sensor.

The above and other objects and features of the present invention will become apparent from the following descriptions of preferred embodiments of the invention taking reference to the accompanying drawings in which.

Figure 5:
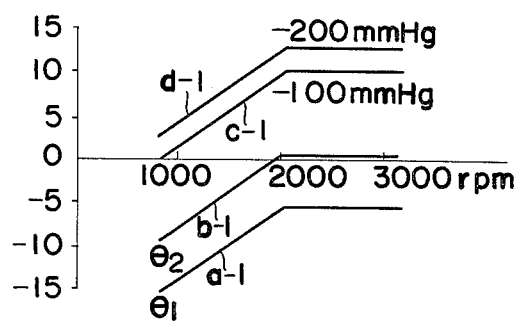
Figure 5:
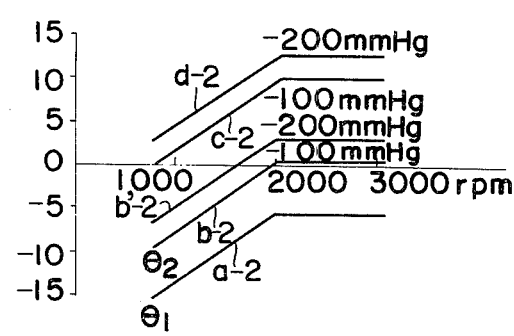
Figure 5:
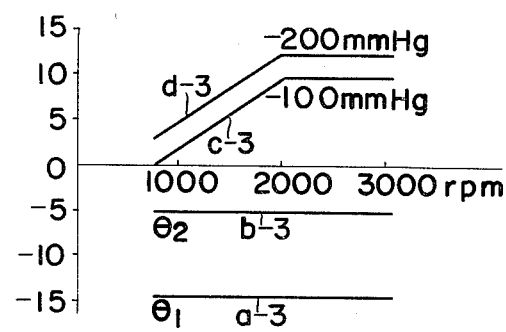
Figure 5:
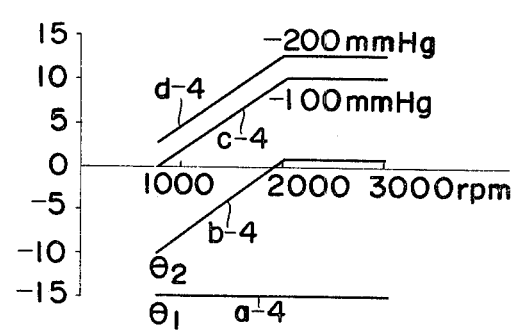
Figure 6:
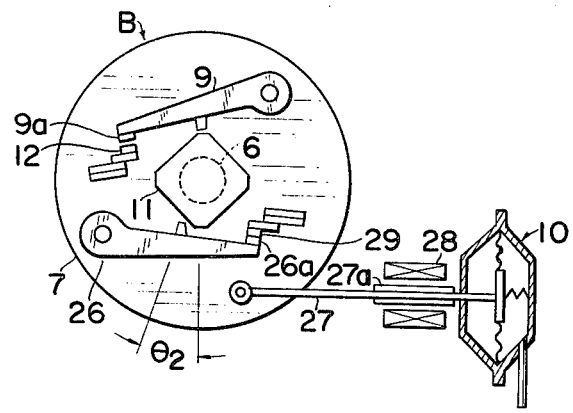
Figure 7:
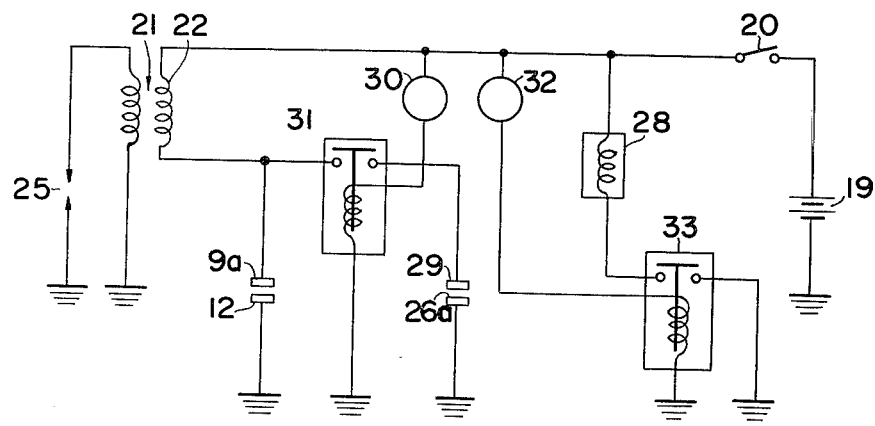

FIGS. 5 (i), (ii), (iii) and (iv) show examples of operations of the devices in accordance with the present invention;

FIG. 6 is a diagrammatical plan view of a further embodiment of the present invention; and FIG. 7 is a circuit diagram of the electric circuit in ignition system employing the device shown in FIG. 6.

Figure 1:
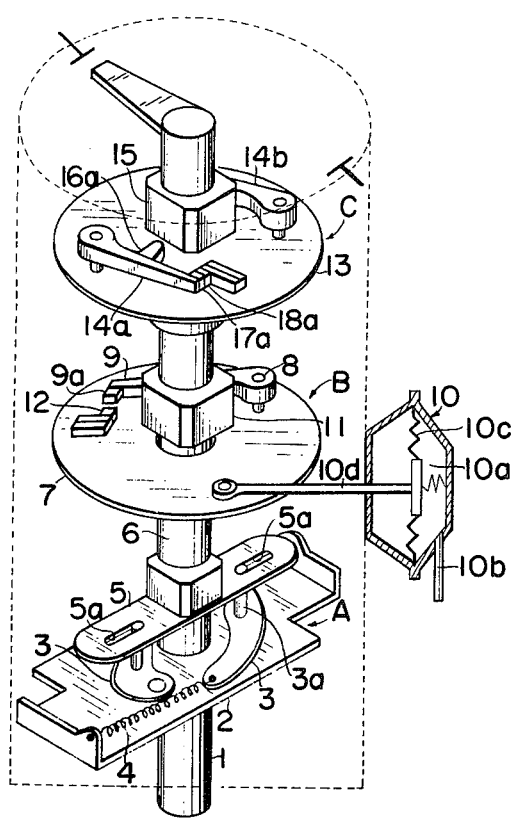
FIG. 1 is a perspective view of an engine ignition timing control device in accordance with one embodiment of the present invention.

Referring to the drawings, particularly to FIG. 1, there is illustrated an engine ignition timing control device which includes centrifugal ignition advance means A, suction type ignition advance means B and retarding means C. The device includes a drive shaft 1 which is driven by an engine to which the device is associated, at a speed proportional to the engine speed. The shaft 1 has a governor plate 2 secured thereto and on the governor plate 2 there are mounted a pair of diametrically opposed governor weights 3 each of which is pivotally supported at one end on the governor plate 2 and connected at the other end with a tension spring 4. A second shaft 6 is coaxially and relatively rotatably mounted on the shaft 1 and has a diametrically extending lever 5. The lever 5 has a pair of diametrically opposed and radially extending slots 5a. Each of the governor weights 3 has an upwardly extending pin 3a at the intermediate portion thereof and the pin 3a is inserted into corresponding one of the slots 5a in the lever 5. Thus, it will be understood that the relative angular position of the shaft 6 with respect to the shaft 1 can be determined in accordance with the speed of the shaft 1. As shown in FIG. 1, the shaft 6 passes through the suction type ignition advance means B and the ignition retarding means C. The suction type means B includes a rotatably supported disc 7 on which a breaker arm 9 is pivotally supported at its one end by a pin 8. The arm 9 has a contact 9a at the other end which co-operate with a stationary contact 12 mounted on the disc 7. The shaft 6 has a substantially square cam 11 secured or integrally formed therewith and the arm 9 is provided with a cam follower projection 9b for co-operation with the cam 11. Thus, as the cam 11 is rotated, the arm 9 is swung about the pivot pin 8 so that the contacts 9a and 12 are intermittently opened by the cam 11. A suction device 10 is provided in the means B and has a chamber 10a connected through a pipe 10b with the engine intake system (not shown). The suction device 10 further includes a flexible diaphragm 10c which is connected to one end of axially movable rod 10d. The other end of the rod 10d is connected with the disc 7. Since the disc 7 is rotatably supported in the casing shown by dotted lines in FIG. 1, the angular position of the disc 7 is determined by the suction pressure in the engine intake system. Thus, it will be seen that the timing of opening of the contacts 9a and 12 is determined in accordance with the rotating speed of the shaft 1 and the pressure in the intake system of the engine.

Referring now to the ignition retarding means C, it includes a stationary disc 13 secured to the casing shown by the dotted lines in FIG. 1. Through the center of the disc 13, there passes the aforementioned shaft 6 which further has a substantially square cam 15 integrally formed or secured thereto. On the disc 13, there are mounted a pair of stationary contacts 18a and 18b which are disposed at a substantially diametrically opposite positions. Further, a pair of swingable breaker arms 14a and 14b are mounted on the disc 13. Each of the arms 14a and 14b is pivotally supported at one end of the disc 13 and has a contact 17a or 17b at the other end. The contacts 17a and 17b co-operate with the stationary contacts 18a and 18b, respectively. The arms 14a and 14b have at the intermediate portions thereof cam follower projections 16a and 16b, respectively, which co-operate with the cam 15. Thus, as the shaft 6 is rotated, the cam 15 is also rotated whereby the arms 14a and 14b are caused to swing about their pivotal supports so that the contacts 17a and 17b are intermittently moved apart from the co-operating stationary contacts 18a and 18b. The positions of the contacts 18a and 18b and the arms 14a and 14b are so determined that the contacts 18a and 17a are opened when the cam 15 is rotated by an angle $\theta_1$ from the reference line 9 while the contacts 18b and 17b are opened at the cam rotation angle of $\theta_2$.

Figure 4:
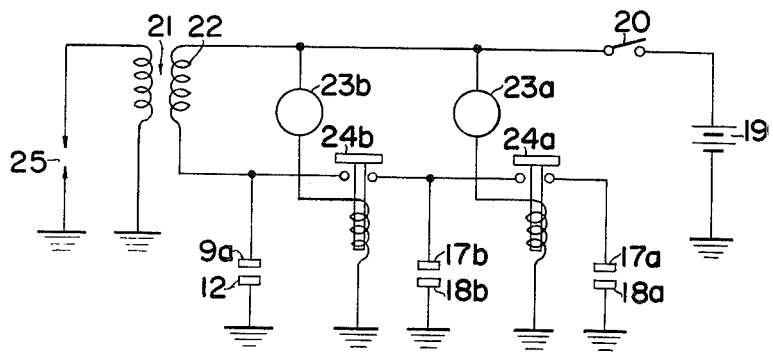
FIG. 4 is a circuit diagram of the electric circuit of ignition system employing the device shown in FIG. 1.

The aforementioned ignition timing control device is used in an ignition system having an electric circuit shown in FIG. 4. In the circuit an electric power source 19 is connected through an ignition switch 20 with one end of a primary coil 22 of ignition coil means 21, the other end of which can be grounded through contacts 9a and 12. Lines including contacts 17a, 18a; and 17b, 18b are arranged parallely with the line including the contacts 9a and 12. A time delay relay 24a is disposed in the line from the contact 17a to the coil 22 and controlled by a timer 23a. A second time delay relay 24b controlled by a timer 23b is disposed in the line from the contact 17b to the coil 21. The secondary coil of the coil means 22 is connected with an ignition plug 25.

During engine start, when the switch 20 is closed, the timers 23a and 23b allows electric current to pass therethrough so that the relays 24a and 24b are closed. Thus, when the engine is cranked, ignition spark is produced only when all of the pairs of contacts 9a, 12; 17a, 18a; and 17b, 18b are opened and the ignition timing can be determined by the timing of opening of the contact pair 17a and 18a. After a predetermined time interval, for example 20 seconds, the timer 23a operates to open the relay 24a. Thereafter, the ignition timing is determined by the timing of opening of the contact pair 17b and 18b. After a further predetermined time interval, for example 90 seconds from the closure of the switch 20, the timer 23b operates to open the relay 24b. Thus, it becomes that the ignition timing is controlled by the contacts 9a and 12 and thus a normal or regular operation of ignition system can be attained.

Referring now to FIG. 6, there is shown a further embodiment of the present invention. In this embodiment, a disc 7 which is rotatably supported in a casing (not shown) has a swingable breaker arm 9 provided with a contact 9a at its free end as in the means B shown in FIG. 1. The disc 7 also has a stationary contact 12 for co-operation with the contact 9a on the arm 9. A shaft 6 passes through the center of the disc 7 and has a cam 11 secured thereto. The shaft 6 is rotated by the associated engine through a centrifugal means such as shown by A in FIG. 1. The angular position of the disc 7 is determined by suction type ignition advance means 10 as in the previous embodiment through a rod 27. A second breaker arm 26 is swingably mounted on the disc 7 and has a contact 26a at its free end for co-operation with a stationary contact 29 disposed on the disc 7. The contact pair 26a and 29 are opened at a timing retarded by an angle $\theta_2$ from the timing of opening of the contact pair 9a and 12. In this embodiment, the rod 27 is is provided with a magnetic material 27a and an electromagnet 28 is disposed in co-operation with the magnetic material 27a. When the magnet 28 is energized, the rod 27 is magnetically held at a predetermined position, so that the disc 7 is locked at such a position in which the contact pair 26a, 29 are opened with a retard of angle $\theta_1$ which is greater than the angle $\theta_2$.

The device shown in FIG. 6 is used in an ignition circuit shown in FIG. 7. As in the previous embodiment, the contact pairs 9a, 12 and 26a, 29 are disposed in parallel relationship. A relay controlled by a timer 30 is inserted in a line between the primary ignition coil 22 and the contact 29. The electromagnet coil 28 is ground through a relay 33 which is controlled by a timer 32. During engine start, when the ignition switch 20 is closed, the coil 28 is energized so that a spark is produced in the plug 25 at a timing with a retard of angle $\theta_1$. After a predetermined time, the relay 33 is opened by the timer 32 and thereafter the ignition timing is controlled by the contact pair 26a and 29. After a further predetermined time, the relay 31 is cut-off by the timer 30 and thereafter the ignition timing is controlled by the contact pair 9a and 12.

Figure 2:
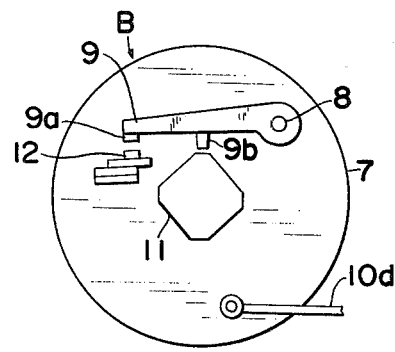
FIG. 2 is a plan view of suction type ignition timing advance means employed in the device shown in FIG. 1.
Figure 3:
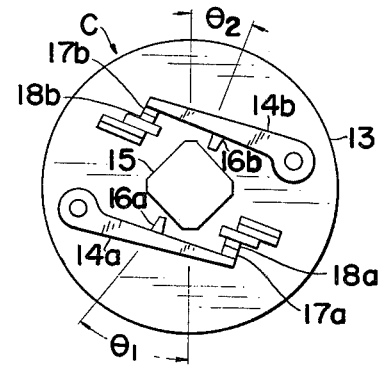
FIG. 3 is a plan view of ignition timing retarding means employed in the device shown in FIG. 1.

Referring now to FIG. 5, there are shown timings at which co-operating pairs of contacts are opened. FIG. 5(i) shows variation in contact opening timings in the ignition timing control device shown in FIGS. 1 through 3. In the diagram, the ordinate represents the contact opening timing in degree with the value 0 corresponding to a nominal ignition timing of the engine, and the abscissa represents the engine speed. In the embodiment of FIG. 1, since the effect of the engine speed is reflected in the position of the cam (11), the timings of the contact pairs (17a), (18a) and (17b), (18b) are gradually increased in response to the increase in the engine speed as shown by lines a-1 and b-1 in FIG. 5(i). The timing of the contact pair (9a), (12) is affected by the engine intake pressure as well as the engine speed, so that it changes as shown by lines c-1 and d-1 in accordance with these factors. Thus, during engine start, the ignition timing is retarded by 15° from the nominal timing and, as the engine speed increases, it is gradually advanced along the line a-1. After a predetermined time, the relay (24a) is opened and the ignition timing is determined by the line b-1. After a further predetermined time, the relay (24b) is opened so that the ignition timing is controlled only by the contact pairs (9a), (12) in accordance with the engine speed and the engine intake pressure. With the engine speed above 2,000 RPM, the ignition timing remains unchanged irrespective of any change in the engine speed.

FIG. 5(ii) shows contact opening timings in the embodiment shown in FIG. 6. In this embodiment, the timing of the contact pair (26a), (29) in $\theta_2$ mode is changed in accordance with the engine intake pressure as shown by lines b-2 and b'-2 in FIG. 5(ii) although the timing in $\theta_1$ mode is independent from the engine intake pressure as shown by line a-2.

In the previous embodiments, the timing of the contact pairs for determining the ignition timing during engine start is changed in response to either or both of the engine speed and the engine intake pressure, however, it should be noted that the timing of the ignition retard contact pairs may be fixed. For example, in the embodiment in FIG. 1, the ignition retard means c may be so arranged that the cam (15) is driven directly by the shaft (1) at a speed proportional to the engine speed. Then, the timings of the contact pairs (17a), (18a) and (17b), (18b) become as shown by lines a-3 and b-3 in FIG. 5(iii). This arrangement is more effective to decrease the amount of air polluting constituents in the engine exhaust gas than in the previous embodiment. FIG. 5(iv) shows a further modification in which the timing of one of the ignition retarding contact pairs is fixed while that of the other is changed in response to the engine speed as shown by lines a-4 and b-4. It has been found that this arrangement is very effective to make the engine exhaust gas clean and improve controllability of the engine during the engine warming up period.

Although, in the previous embodiments, the ignition timing control devices have been described as including automatic ignition advance means which may be of centrifugal and/or suction type, it should of course be noted that the invention can as well be applied to an ignition system having no automatic ignition advance means. Further, it should also be noted that in the present invention, the ignition timing may be set to a normal or standard value even during engine start until the engine attains a predetermined speed, for example, 1,300 RPM so that the engine starting characteristics is improved. Thus, the descriptions of the previous embodiments shall not be construed in a limitative sense but the scope of the present invention shall be limited only by the appended claims.

I claim:

1. Ignition system for an internal combustion engine comprising ignition plug means, first breaker means for determining a standard ignition timing for normal operation of the engine, second breaker means for providing at least two retarded ignition timings including a first retarded timing and a second retarded timing which is less retarded than the first retarded timing, and sequential advance means for changing the ignition timing from said first retarded timing to said second retarded timing and then to said standard ignition timing during engine starting to thereby sequentially advance said ignition timing.

2. Ignition system for an internal combustion engine in accordance with claim 1 in which said sequential advance means includes timer means.

3. Ignition system for an internal combustion engine in accordance with claim 1 which further comprises ignition timing advance means for advancing at least said standard ignition timing in accordance with at least one of engine speed and engine intake pressure.

4. Ignition system for an internal combustion engine in accordance with claim 3 in which said advance means is so arranged that said second retarded timing is also advanced at least in accordance with the engine speed.

5. In an ignition system for an internal combustion engine, an ignition timing control device including first breaker means for providing a standard ignition timing for normal engine operation, second breaker means for providing at least two retarded ignition timings including a first retarded timing and a second retarded timing which is less retarded them the first retarded timing, first timer means for advancing the ignition timing from said first retarded timing to said second retarded timing after a first predetermined time after engine start, and second timer means for advancing the ignition timing from said second retarded timing to said standard timing.

6. An ignition timing control device in accordance with claim 5 in which said first breaker means includes a cam provided on a shaft which is adapted to be driven by the engine and breaker contacts comprising a stationary contact mounted on a stationary disc and a movable contact adapted to be actuated by said cam so that it is moved into and out of contact with said stationary contact, and said second breaker means includes a second cam provided on said shaft and at least two pairs of breaker contacts which are opened at two different timings retarded more than the opening timing of the contacts in said first breaker means.

7. An ignition timing control device in accordance with claim 6 in which means is further provided for centrifugally shifting the angular phase of said shaft so as to provide an ignition timing advance in accordance with the engine speed.

8. An ignition timing control device in accordance with claim 6 in which means is further provided for shifting the angular position of said stationary disc in accordance with the engine intake pressure.

9. In an ignition system for an internal combustion engine, an ignition timing control device comprising a cam provided on a shaft which is adapted to be driven by the engine, a first pair of breaker contacts including a stationary contact mounted on a disc and a movable contact, a second pair of breaker contacts including a stationary contact mounted on said disc and a movable contact adapted to be actuated by said cam into and out of contact with said stationary contact, the timing of opening of said second pair of contacts being retarded more than that of said first pair of contacts, means for shifting the angular position of said disc by a predetermined angle so that the opening timing of said second pair of contacts is further retarded, and timing means for deenergizing said shifting means after a first predetermined time from engine start and for cutting-off said second pair of contacts from the ignition circuit after a second longer predetermined time from engine start.

10. An ignition timing control device in accordance with claim 9 in which means is provided for centrifugally shifting the angular phase of said shaft so as to provide an ignition timing advance in accordance with the engine speed.

11. An ignition timing control device in accordance with claim 9 in which means is further provided for shifting the angular position of said stationary disc in accordance with the engine intake pressure.

12. Ignition system for an internal combustion engine comprising ignition plug means, breaker means for providing a standard ignition timing for normal operation of the engine and at least two retarded ignition timings including a first retarded timing and a second retarded timing which is less retarded than the first retarded timing, and means for changing the ignition timing from said first retarded timing to said second retarded timing and then to said standard timing during engine starting to thereby sequentially advance said ignition timing.

* * * * *